UNITED STATES PATENT OFFICE.

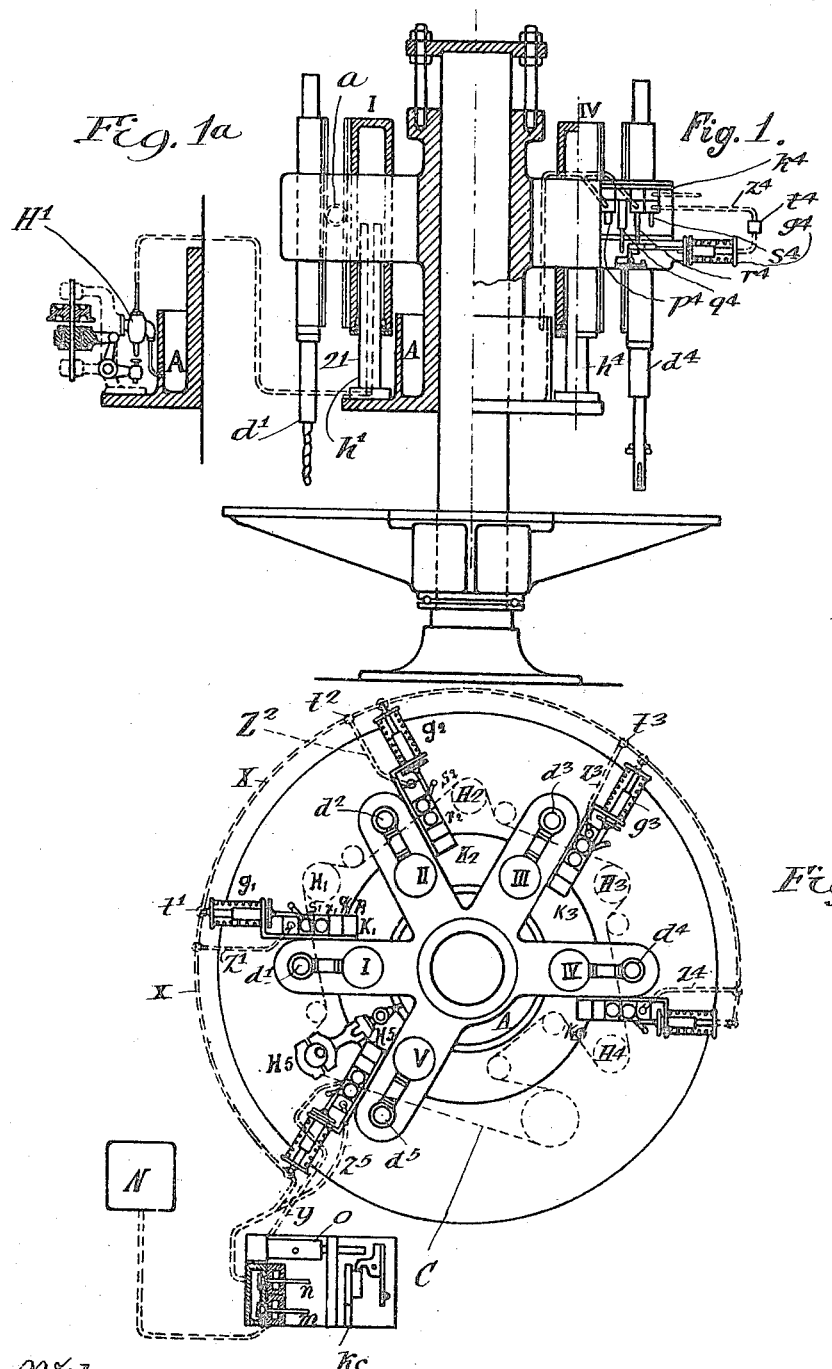

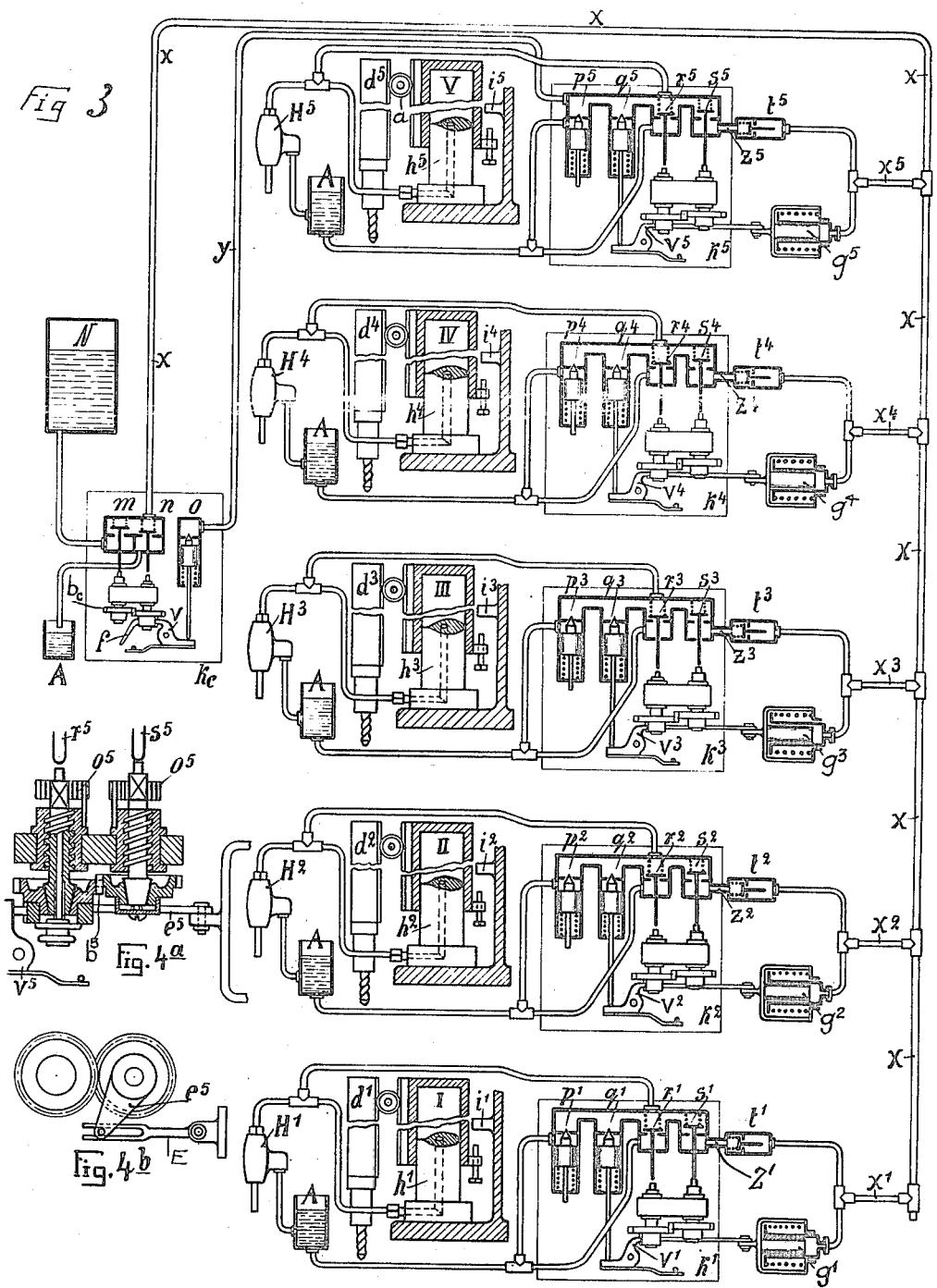

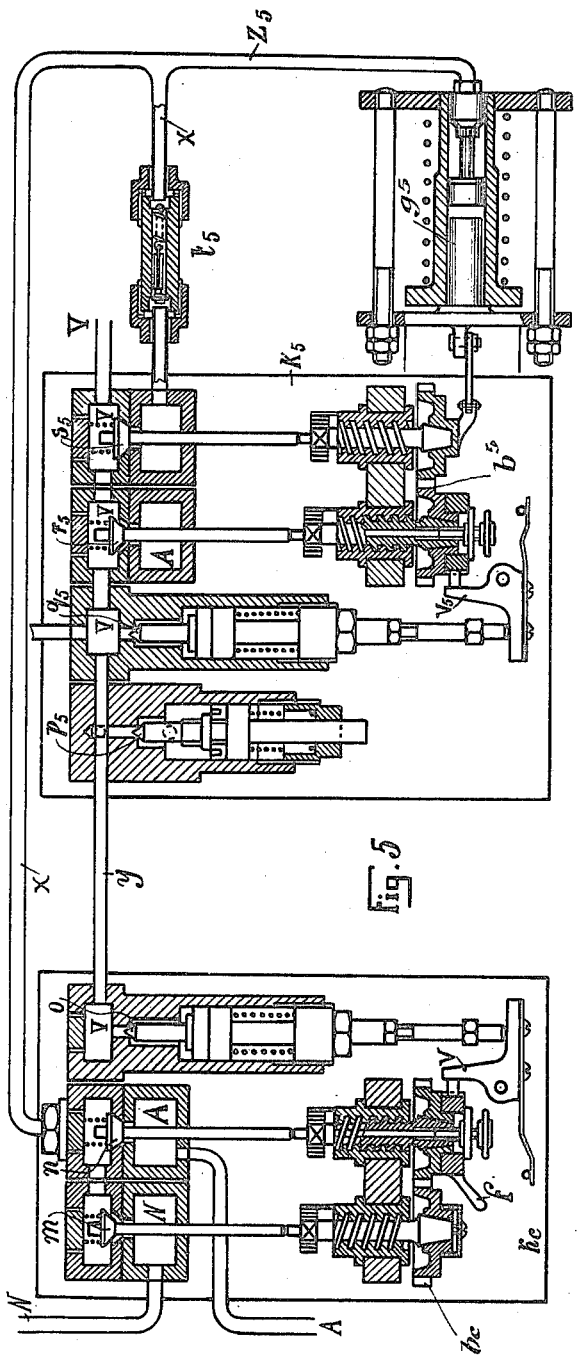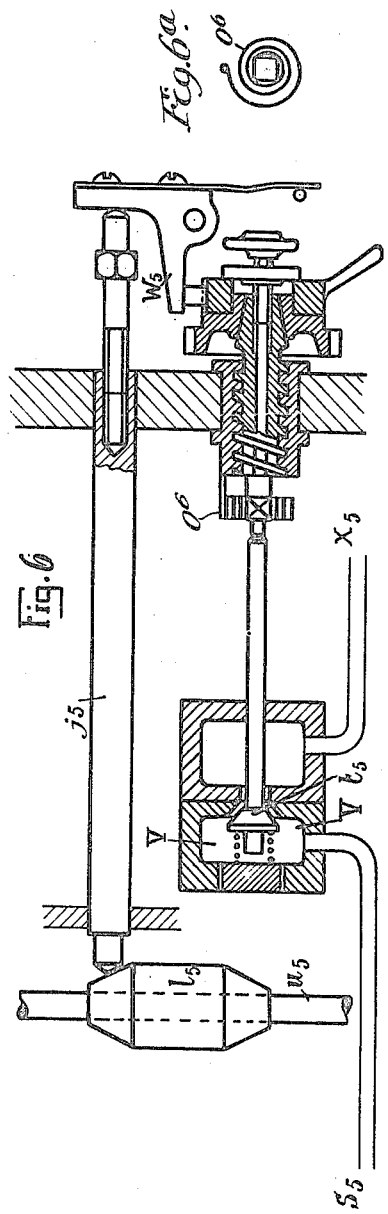

FRITZ WOLFENSBERGER, OF MULHEIM-ON-THE-RHINE, GERMANY.

HYDRAULIC CONTROLLING DEVICE FOR MACHINE-TOOLS.

1,232,880.

Specification of Letters Patent. Patented July 10, 1917.

Application filed December 12, 1913. Serial No. 806,158.

*To all whom it may concern:*

Be it known that I, FRITZ WOLFENSBERGER, a subject of the German Emperor, residing at Mulheim-on-the-Rhine, Germany, Deutzerstrasse, have invented new and useful Improvements in Hydraulic Controlling Devices for Machine-Tools, of which the following is a specification.

This invention relates to an improved hydraulically operated tool machine. The feed is automatically effected by hydrostatic pressure after the machine is once started, so that an absolutely determined control of the speed which has been previously exactly adjusted, is effected, and the operation of the feeding mechanism is rendered independent from frictional conditions and the head of the hydrostatic pressure; and the machine is brought to a standstill after having performed a predetermined amount of work.

The movement of the tools, according to this invention, is effected by attaching on the tool machine a hydraulic cylinder and connecting the tool with a piston or vice versa, the piston sliding in this cylinder by the pressure of water entering the cylinder from a pump without accumulator.

The omission of an accumulator in the conduit between pump and operating cylinder is rendered necessary for the reason that thereby a positive relation between the stroke of the pump and the movement of the tool is obtained, in the sense that the volume of water displaced by each stroke of the pump effects a proportionate and accurately predetermined advance of the piston of the operating cylinder, regardless of the resistance of the tool that is connected with the operating piston and independent from the friction of the machine.

The controlling device is based upon the idea that in a hydraulic system without an accumulator which consists merely of a conduit, an active mechanically driven pump piston and a passive working piston, the pressure in the conduit is solely determined by the elastic resistance of the passive piston and that the pressure suddenly rises as soon as the piston encounters a rigid resistance. This encountering a resistance and the increasing of pressure in the conduit thereby entailed, is utilized in accordance with the present invention for actuating certain control member or members combined with hydraulic valves which initiate another tool movement.

A valve that connects the cylinder with the waste water is primarily opened by a control member, so that the cylinder or piston is allowed to be drawn back by a suitable constantly operating force which may be spring tension, and thus the tool is returned to its inoperative position.

Even though, for the above cited reasons, the operating cylinder during the time that the tool is working must be connected with a pump not provided with an accumulator, nevertheless said cylinder may, during the period that it approaches the work, be connected with a source of liquid supply provided with an accumulator, because an accurately determined rate of feed is not required during that period, but only the quickest possible advance of the tool to the work, which may be produced by a uniform hydraulic pressure that is less than that which is required in the pump without accumulator during the cutting operation. This accumulator is in no way dependent on the pump without an accumulator required for feeding the tool during the cutting operation; the feed could of course be effected by this pump, but it is advantageously effected by another pump adapted to operate at high pressure, while the pump with accumulator operates preferably at a low pressure. As soon as the tool, subject to the pressure of the accumulator water and making rapid progress, has approached near enough to the work, the cylinder must be disconnected from the accumulator and must be arranged to be actuated only by the high pressure pump without accumulator, in order to effect the slow but accurately regulated cutting movement of the tool.

Special means are necessary when it is desired to render a plurality of tools simultaneously operative by hydraulic means from a central station in such a manner that so long as they are separated from the work they move quickly, while, when they have encountered the work, they are fed automatically by a hydraulic high pressure pump at a rate determined by the stroke of the pump.

This problem presents itself, for example, in the case of a multi-spindle drilling machine: Each drill must be provided with a separate hydraulic cylinder and a special hydraulic high pressure pump, in order to effect the feed of each drill separately. Each drill must be provided with a separate control member causing the tool to return at the right time, as all have to effect strokes of different length and perform their work at different times.

Figure 1 is an elevation partly in section, of a multi-spindle drilling machine showing displaced from its normal position and on a larger scale a pump $H^1$;

Fig. 2 is a plan of the same;

Fig. 3 is a diagrammatic illustration showing the connections of the various control members;

Figs. $4^a$ and $4^b$ are details; $4^a$ being in section, and $4^b$ in plan, showing particular features of the control of two valves;

Fig. 5 is an enlarged view in section of the valve-box of the central station and of a single valve-box appurtenant to a drill;

Fig. 6 is a modification of the non-return valve shown in Fig. 5; and,

Fig. $6^a$ is a detail of the spring $O^6$ of Fig. 6.

Similar reference characters in these figures refer to corresponding parts.

The machine illustrated by way of example contains a plurality of drills $d^1$, $d^2$, $d^3$, $d^4$, $d^5$, which are connected with hydraulic cylinders I, II, III, IV, V by having the spindles and the cylinders provided with racks, each pair of which engage a common toothed wheel or pinion $a$, so that cylinder and spindle are compelled to move in opposite directions. Each cylinder is connected to a high pressure pump $H^1 \ldots H^5$ which is without an accumulator; all these pumps are constantly actuated by suitable means, such as a belt C, driven from the machine. The stationary pistons $h^1 \ldots h^5$ of the cylinders are secured to the frame of the tool machine. A valve-box $k^1 \ldots k^5$ (Figs. 2, 3 and 5) is appurtenant to each drill, the valves thereof being connected in the manner shown in Fig. 3, with the high pressure pump H of the respective drill, with the waste water conduit A from which the suction inlet of the high pressure pump is fed and with the conduits $x^1 \ldots x^5$ which connect with the central station through the joint conduit $x$. Separated from these valve-boxes $k^1 \ldots k^5$ there is arranged at a suitable point the central station with a valve-box $k_c$ (Figs. 2, 3 and 5), which is connected with the hydraulic accumulator N and in addition communicates with the said joint conduit $x$ for all the valve-boxes of the drills. The valve-box $k_c$ is further in communication with one of the valve-boxes $k^1 \ldots k^5$, for instance $k^5$, by means of a conduit $y$.

The valve-boxes $k^1$, $k^2$, $k^3$, $k^4$, $k^5$ of the drills (Figs. 3 and 5) each contain four valves $p^1$, $q^1$, $r^1$, $s^1$; $p^2$, $q^2$, $s^2$, $r^2$, $p^3$, $q^3$, $r^3$, $s^3$; $p^4$, $q^4$, $r^4$, $s^4$; and $p^5$, $q^5$, $r^5$, $s^5$ and are connected with starting cylinders $g^1$, $g^2$, $g^3$, $g^4$ and $g^5$, hereinafter described, which bring some of the valves into their initial positions. All these starting cylinders are in communication by means of the conduit $x$, with the valve chamber of the box $k_c$ containing the valves $m$, $n$. The valves $s^1$, $s^2$, $s^3$, $s^4$ and $s^5$ are joined by conduits $z^1$, $z^2$, $z^3$, $z^4$ and $z^5$ and non-return valves $t^1$, $t^2$, $t^3$, $t^4$ and $t^5$ to the conduit $x$; and one of the valves $s^1$, $s^2$, $s^3$, $s^4$ and $s^5$ (viz. $s^5$) is in communication by a conduit $y$ with the valve $o$ in the central valve-box $k_c$.

The valves $r^1 \ldots r^5$, $s^1 \ldots s^5$ (Fig. $4^a$, $4^b$, 5) are pressed by springs on their seats, but can be opened by spindles with left or right-hand threads. The spindles are connected by toothed wheels $o^5$ (Fig. $4^a$, $4^b$), so that by turning the spindle $s^1 \ldots s^5$ the other spindles $r^1 \ldots r^5$ are also turned, but in the opposite direction. The spindles are provided with springs, $o^5$, (Fig. $4^a$), tending to turn these spindles to occupy certain normal positions, i. e., to open valves $r^1 \ldots r^5$ and to close valve $s^1 \ldots s^5$. By turning levers such as $e^5$ (Fig. $4^b$) connected to the spindles of the valves $r^1 \ldots r^5$, $s^1 \ldots s^5$, these spindles move the valves to occupy the contrary position, so that valves $r^1 \ldots r^5$ will be closed and valves $s^1 \ldots s^5$ opened. In this position the valves are held by ratchet wheels and pawls $v^1 \ldots v^5$ (Figs. 3 and 5).

The valves $q^1 \ldots q^5$ normally are pressed on their seats by springs; (Figs. 3, 5), but if the pressure in the respective cylinders exceeds the normal measure, the valves $q^1 \ldots q^5$ will be raised, the liquid enters the space above the piston of the valve and displaces the piston. These control members or piston valves $q^1 \ldots q^5$ are so connected with the said valves $r^1 \ldots r^5$, $s^1 \ldots s^2$ as to reverse these latter valves, thus causing the entrance or outlet of water to the cylinders and initiating new piston movements. Piston valves $q^1 \ldots q^5$ when displaced, strike pawls $v^1 \ldots v^5$ and these are moved out of engagement with their ratchet wheels so that valves $r^1 \ldots r^5$, $s^1 \ldots s^5$ under the influence of the springs $o^5$ return to their normal positions.

The initial adjustment of the valves $r^1 \ldots r^5$, $s^1 \ldots s^5$ is regulated by the starting cylinders $g^1 \ldots g^5$. The pistons of these cylinders are forced into the interior of the cylinder by a force such as spring tension (Figs. 2 and 5). When, however, water is fed through the central station and conduit $x$ from the accumulator N, then the pistons are forced out and remain in that outer position until the conduit $x$ is again placed in communication with the waste water conduit A, due to changes in the positions of the valves of the central station $k_c$, whereupon the said pistons return to their interior position as illustrated. The starting cylinder pistons are connected with the levers $e^1 \ldots e^5$ (see $e^5$ Figs. 4ᵃ and 4ᵇ) of the valves $r^1 \ldots r^5$, $s^1 \ldots s^5$ in such a manner that upon the forward movement of the pistons the valves are moved from out of their normal or final position into their illustrated initial position, (Fig. 3) in which valves $r^1 \ldots r^5$ are closed and $s^1 \ldots s^5$ are opened. The valves however are not so connected with the pistons of the starting cylinders that they are forced to accompany the pistons on the return movement of the latter. Inasmuch as the connection is effected by such means as a forked lever E (Fig. 4ᵇ), the valves remain retarded in their position by the ratchets $v^1 \ldots v^5$, when the pistons return.

The valves $m$ and $n$ of the central station, joined to one another by gears $b_c$ are brought into their initial position by a hand lever $f$ and held in this position by a pawl $v$.

This pawl may be released by the piston valve $o$, when the same is displaced upon the increase in pressure in the conduit $y$; the valves $m$ $n$ subsequently return into their normal or final position ($m$ closed, $n$ opened).

The operation is as follows:

For starting the engine from the central station the lever $f$ is brought in such a position that (as indicated in Fig. 3) valve $m$ is open and valve $n$ closed. Then water flows from the accumulator through the valve $m$ and by conduit $x$ to the several starting cylinders $g^1$, $g^2$, $g^3$, $g^4$ and $g^5$. The pistons of the starting cylinders move forward and turn the spindles of the valves $r^1$, $s^1$, $r^2$, $s^2$, $r^3$, $s^3$, $r^4$, $s^4$ and $r^5$, $s^5$ so that $r^1$, $r^2$, $r^3$, $r^4$, $r^5$ are closed and $s^1$, $s^2$, $s^3$, $s^4$, $s^5$ are opened (Fig. 3).

By this means the cylinders I, II, III, IV and V of the several drills are placed in communication with the conduit $x$ and, therefore, with the accumulator. Furthermore, each of the cylinders, as before explained, is connected with a high pressure pump $H^1 \ldots H^5$ (Fig. 3). As the resistance to the movement of the drill before it reaches the work is considerably less than the available accumulator pressure, the drill proceeds under the pressure of the accumulator water with which the water supplied by the high pressure pump mingles, until the work is reached. Then the resistance increases to such an extent that it cannot be overcome by the accumulator pressure. As soon as this point is attained with each cylinder, the respective non-return valve $t^1$, $t^2$, $t^3$, $t^4$ or $t^5$ of that cylinder closes under the pressure of the high pressure pump $H^1 \ldots H^5$ and the tool then moves forward only in proportion to the stroke of this pump. This is repeated in all the cylinders I, II, III, IV and V. As before explained, the piston valve $o$ at the central station is connected by a pipe $y$ with one of the cylinders—the cylinder V for example,—(Figs. 2 and 3 show). Accordingly as soon as the cylinder V has completed its work, and its pressure increases owing to encountering a stop (such as $i^5$ in Fig. 3), the piston valve $o$ opens and the valves $m$ and $n$ are reversed. The result is that the conduit $x$ is brought in communication with the waste water chamber and so relieved; and all the pistons of the starting cylinders $g^1$, $g^2$, $g^3$, $g^4$ and $g^5$ return to their end position, shown in the drawings, while the valves $r^1$, $r^2$, $r^3$, $r^4$ and $r^5$ and $s^1$, $s^2$, $s^3$, $s^4$ and $s^5$ actuated by them, are in the meantime held in position by the pawls $v^1$, $v^2$, $v^3$, $v^4$ and $v^5$. When the pressure in the cylinder V increases further, piston valve $q^5$ is also opened and the two valves $r^5$ and $s^5$ reversed so as to open $r^5$ and close $s^5$. By this means the cylinder V is brought in communication with the waste water chamber and so relieved and the drill spindle can move retractively under the influence of a counter pressure such as the weight of the cylinder. The same operation is repeated in the other cylinders, as soon as they have finished their work and their pistons strike a stop which causes the pressure to rise and the valve $q^1 \ldots q^4$ of the respective cylinders to open. The cylinders I, II $\ldots$ IV are not connected with the valve $o$ of the central station like the cylinder V. This is not necessary, because if the valves $q^1$, $q^2$, $q^3$ and $q^4$ open later than $q^5$, the action is the same as described with reference to cylinder V; if, however, one valve, the valve $q^3$, for example, opens earlier, although the pawl $v^3$ is displaced, whereby the blocking of the valves $r^3$ and $s^3$ ceases, the valves are unable to spring back, as they are held in position by the starting cylinder pistons. In this case the pump $H^3$ of the valve in question continues to pump idly, an excessive increase of pressure in the conduit being prevented by the safety valve $p^3$. As soon as the cylinder V has reached its stop, however, and back pressure upon the valves $q^5$ has caused the reversal of the valves $m$ and $n$ as well as the valves $r^3$ and $s^3$, the starting cylinder pistons also move retractively and the valves $r^3$ and $s^3$ are then able to spring back under the influence of the valve springs, whereby the cylinder III is relieved.

The operation will be apparent by the following table, relating to cylinder V for example indicating the positions of the valves as follows:

(−) valve closes.
− valve closed.
(1) valve opens.
1 valve open.

| Functions of the hydraulic control. | Positions of the valves. | | | | | | Action upon the piston. |
|---|---|---|---|---|---|---|---|
| | $m$ | $n$ | $o$ | $q^5$ | $r^5$ | $s^5$ | |
| At the central station lever $f$ is hand operated. Valve $m$ places the starting cylinder $g^5$ in communication with a pressure water accumulator. | (1) | (−) | − | − | 1 | − | Piston of the starting cylinder $g^5$ moves forward. |
| The starting cylinder $g^5$ has reached its extreme position. Springs of valves $r^5$ and $s^5$ cocked, valves $r^5$ and $s^5$ brought in their initial position. (Fig. 3.) | 1 | − | − | − | (−) | (1) | Cylinder V moves quickly forward. |
| The tool strikes the work piece. The pressure of the accumulator is insufficient for further forward movement. The non-return valve $t$ closed. The pressure in the cylinder rises through the pump $H^5$. | 1 | − | − | − | − | 1 | Cylinder V moves slowly forward. |
| The stop $i^5$ of cylinder V is reached. | 1 | − | − | − | − | 1 | The cylinder V remains stationary (under pressure). |
| The pressure rises until it opens the piston valve $o$; the valves $m$, $n$ are reversed. | (−) | (1) | (1) | − | − | 1 | The cylinder V remains stationary (without hydraulic pressure). The piston of the starting cylinder $g^5$ tends to move retractively. |
| The pressure in cylinder V continues to rise until it opens the reversing valve $q^5$ and this reverses the valves $r^5$ $s^5$. | − | 1 | − | (1) | (1) | (−) | The cylinder V recedes. End of operation. |

The advantages of such a hydraulic reversible multispindle drilling machine resides in great economy in labor. Assuming that as much time is occupied in unclamping a piece of work and clamping a fresh piece as is required for machining a piece, such a machine replaces six separate machines which would require attention by six workmen, because after all the five drilling tools (drill, cutter, reamer, tap and so forth) have completed their work, it is only necessary to rotate the table through 60° from a central station and by reversing the lever $f$ to supply water under pressure to the several starting cylinders, whereupon they complete their work independently of each other, while the workman unclamps the finished piece of work and clamps a fresh blank. As each blank is machined by five different tools in succession, this corresponds to machining by five separate machines whose output in a given time would only amount to five-sixths of the out-put of the hydraulic machine as they are inoperative during the clamping and unclamping operations.

Fig. 6 shows a modification of the valve $t^5$ (Fig. 5) in the conduit $z^5$ leading to the valve $s^5$. This valve has for its purpose to close the supply of accumulator water to the work cylinder of the drill when the drill has reached the work, the supply of the high pressure pump $H^5$ being continued.

Instead of building this valve $t^5$ as a non-return valve (as illustrated in Fig. 5) in certain cases it is preferred to govern the valve by the forwardly moving piston or cylinder which drives the tool. The rod $u^5$ (Fig. 6) with the adjustable tappet $l^5$ is attached to the cylinder V moving upward under the influence of the accumulator water. On approaching the work piece this tappet displaces by the rod $j^5$ the lever $w^5$, thereby releasing the spring $o^6$ (Figs. 6 and 6$^a$) and reversing the valve $t^5$ so as to close it. The cylinder is then in communication only with the high pressure pump $H^5$ and the tool is displaced toward the work piece with a feed movement corresponding to the stroke of the pump.

I claim:

1. Hydraulic controlling device for machine tools, consisting of the combination of a tool machine, a tool, hydraulic cylinder and piston, one of said hydraulic members being attached to said machine and the other member being connected with said tool, a constantly driven high pressure fluid pump without accumulator, a conduit between said pump and said cylinder, a stop to limit the movement of said piston or cylinder whereby an excess of pressure is caused in said conduit, a loaded piston valve in connection with said conduit, said piston valve being adapted to be displaced by the excess of pressure in said conduit, a waste fluid chamber, and a valve released by said piston valve, which valve on the displacement of said piston valve opens a connection from said cylinder to said waste fluid chamber permitting said piston or cylinder to return.

2. Hydraulic controlling device for machine tools, consisting of the combination of a tool machine, a tool, a hydraulic cylinder and piston, one of said hydraulic members being attached to said machine and the other being connected with said tool, a constantly driven high pressure fluid pump without accumulator, a conduit between said pump and said cylinder, a stop to limit the movement of said piston or cylinder whereby an excess of pressure is caused in said conduit, a loaded piston valve in connection with said conduit, said piston valve being adapted to be displaced by the excess of pressure in said conduit, a waste chamber, a valve separating said cylinder from said waste fluid chamber, means for holding said valve in one position, and means adapted to be released by said piston valve tending to move said valve to the contrary position.

3. Hydraulic controlling device for machine tools, consisting of the combination of a tool machine, a tool, hydraulic cylinder and piston, one of said hydraulic members being attached to said machine and the other member being connected with said tool, a constantly driven high pressure fluid pump without accumulator, a conduit between said pump and said cylinder, a stop to limit the movement of said piston or cylinder whereby an excess of pressure is caused in said conduit, a loaded piston valve in connection with said conduit, said piston valve being adapted to be displaced by the excess of pressure in said conduit, a waste fluid chamber, a valve controlled by said piston valve, which valve on the displacement of said piston valve opens a connection of said cylinder to said waste fluid chamber so as to allow said piston or cylinder to return, another valve, and a fluid pressure starting cylinder with a starting piston moving therein and connected with said latter valve so as to hold same in one position when actuated by fluid pressure, means tending to move said valve to the opposite position and a second piston valve in communication with said conduit and adapted for releasing said means.

4. Hydraulic controlling device for machine tools, consisting of the combination of a tool machine, a tool, hydraulic cylinder and piston, one of said hydraulic members being attached to said machine and the other member being connected with said tool so as to move same, a constantly driven high pressure fluid pump without accumulator, a conduit between said pump and cylinder, an accumulator, a conduit between said cylinder and said accumulator, a waste fluid chamber, a valve separating said cylinder from said waste fluid chamber and a valve in the said conduit between cylinder and accumulator, these said valves being so connected, that when one is closed the other is open.

5. Hydraulic controlling device for machine tools, consisting of the combination of a tool machine, a tool, hydraulic working cylinder and piston, one of said hydraulic members being attached to said machine and the other member being connected with said tool so as to move same, a constantly driven high pressure fluid pump without accumulator, a conduit between said pump and said cylinder, an accumulator, a stop to limit the movement of said piston or cylinder whereby an excess of pressure in said conduit is caused, a loaded piston valve in connection with said conduit, said piston valve being adapted to be displaced by the excess of pressure in said conduit, a waste fluid chamber, a valve separating said cylinder from said waste fluid chamber, a valve separating the cylinder from said accumulator, an auxiliary fluid pressure starting cylinder, a starting piston movable therein and connected with said valves so as to hold same in one position, means tending to move said valves to the contrary position, said piston valve being adapted to release said means and permit operation thereof.

6. Hydraulic controlling device for machine tools, consisting of the combination of a tool machine, a tool, hydraulic cylinder and piston, one of said hydraulic members being attached to said machine and the other member being connected with said tool so as to move same, a constantly driven high pressure fluid pump without accumulator, a conduit between said pump and said cylinder, a stop to limit the movement of said piston or cylinder whereby an excess of pressure in said conduit is caused, two loaded piston valves in connection with said conduit, said piston valves being adapted to be displaced by the excess of pressure in said conduit, a valve controlled by one of said piston valves, which valve on the displacement of said latter piston valve opens an outlet from said cylinder permitting said piston or cylinder to return, another valve, a fluid pressure starting cylinder, a starting piston movable therein and connected with said other valve so as to hold same in one position, means tending to move said valve to the opposite position, said other piston valve being adapted on its displacement to release said means.

7. Hydraulic controlling device for multiple machine tools consisting of the combination of a tool machine, a plurality of tools, a plurality of hydraulic working cylinders and pistons, certain of said hydraulic members being connected with one of said tools so as to move it, said other hydraulic members being attached on the machine, a waste fluid chamber, a plurality of valves which connect the cylinders with said waste chamber, a plurality of other valves which connect the cylinders with an accumulator, a plurality of starting cylinders adapted to move said valves, a central station valve-box having a valve for admitting fluid under pressure to the starting cylinders so as to cause said valves between the working cylinders and the waste fluid chamber to close, and said valves between the working cylinders and the accumulator to open, means for closing the communication of the working cylinders and the accumulator at a predetermined moment, a plurality of high pressure pumps, a central station piston valve adapted to be displaced by an excess of pressure produced by one of said hydraulic pumps, said piston valve on its displacement being adapted to release a valve between the starting cylinders and said waste fluid chamber so that the starting pistons return and permit said valves connecting the working cylinders with said waste fluid chamber and said valves connecting same with said accumulator to return to their contrary positions.

In testimony whereof I have signed my name to this specification in the presence of two subscribing witnesses.

FRITZ WOLFENSBERGER.

Witnesses:
    LOUIS VANDORN,
    OSCAR DEPNER.